(12) United States Patent
Burd et al.

(10) Patent No.: US 7,199,731 B1
(45) Date of Patent: *Apr. 3, 2007

(54) DC-FREE CODES

(75) Inventors: Gregory Burd, Santa Clara, CA (US); Pantas Sutardja, San Jose, CA (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 118 days.

This patent is subject to a terminal disclaimer.

(21) Appl. No.: 11/181,401

(22) Filed: Jul. 14, 2005

Related U.S. Application Data

(63) Continuation of application No. 10/155,777, filed on May 24, 2002, now Pat. No. 6,917,313.

(60) Provisional application No. 60/349,895, filed on Jan. 16, 2002, provisional application No. 60/352,776, filed on Jan. 28, 2002.

(51) Int. Cl.
*H03M 5/00* (2006.01)
(52) U.S. Cl. ...................................... 341/58
(58) Field of Classification Search .......... 341/58, 341/59, 94, 50, 93, 82, 67; 371/48, 55; 375/110, 375/116, 340, 261, 253, 341
See application file for complete search history.

(56) References Cited

U.S. PATENT DOCUMENTS

| 4,027,335 | A |   | 5/1977  | Miller              |        |
|-----------|---|---|---------|---------------------|--------|
| 4,775,985 | A |   | 10/1988 | Busby               |        |
| 4,833,471 | A | * | 5/1989  | Tokuume et al.      | 341/67 |
| 5,198,813 | A |   | 3/1993  | Iaozaki             |        |
| 5,341,134 | A |   | 8/1994  | Benjauthrit         |        |
| 5,469,162 | A |   | 11/1995 | Chaki et al.        |        |
| 5,477,222 | A |   | 12/1995 | Kahlman et al.      |        |
| 5,506,581 | A |   | 4/1996  | Ino et al.          |        |
| 5,508,701 | A |   | 4/1996  | Nose et al.         |        |
| 5,608,397 | A | * | 3/1997  | Soljanin            | 341/58 |
| 5,699,061 | A |   | 12/1997 | Shimpuku            |        |
| 5,854,596 | A |   | 12/1998 | Schouhamer Immink   |        |
| 5,929,794 | A |   | 7/1999  | Hayakawa et al.     |        |
| 6,175,317 | B1|   | 1/2001  | Ordentlich et al.   |        |
| 6,265,994 | B1|   | 7/2001  | Kahlman             |        |

* cited by examiner

*Primary Examiner*—Brian Young

(57) ABSTRACT

An encoder that encodes a communication signal including a precoder that precodes portions of the communication signal. The portions comprise M bits, where M is greater than. A buffer buffers said portions. A DC tracking device that modulates a flip signal based on a comparison of a DC value of one of the portions of the communication signal and an average DC value of N previous bits of the communication signal where N is greater than M. A flip device that selectively flips said portions based on said flip signal.

42 Claims, 6 Drawing Sheets

DC-FREE CODES

CROSS-REFERENCE TO RELATED APPLICATIONS

This application is a continuation of U.S. patent application Ser. No. 10/155,777, filed on May 24, 2002 is now a U.S. Pat. No. 6,917,313. This application claims the benefit of the filing date of U.S. provisional applications No. 60/349,895 filed Jan. 16, 2002, and No. 60/352,776 filed Jan. 28, 2002, the content of each of which is herein incorporated by reference in its entirety.

TECHNICAL FIELD

This invention relates to block coding for communication signals.

BACKGROUND

Communication systems generally employ modulation coding to convert data bits into symbols that are optimized for transmission through the communication channel. Modulation coding can be used to ensure the presence of sufficient information for timing recovery, gain control, and adaptive equalization. Some communication channels such as perpendicular recording channels may inherently include a DC component in the read back signal. The DC component may complicate and degrade the decoding of the signal requiring tracking of the DC offset. In some cases, the performance of DC offset tracking circuits may degrade by as much as two dB in comparison to the average case.

SUMMARY

In one aspect, a modulation code is presented that minimizes data patterns that may inhibit the performance of a DC offset tracking loop. An encoder for encoding a communication signal with the modulation code includes a first precoder to precode the communication signal. A signal buffer buffers a first signal associated with the communication signal. A DC tracking block generates a flip signal as a function of a statistical measure of the precoded communication signal. The flip signal has a flip state and a nonflip state. A flip unit, responsive to the flip signal, flips an output of the signal buffer such that an average DC value of the precoded communication signal approaches zero.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
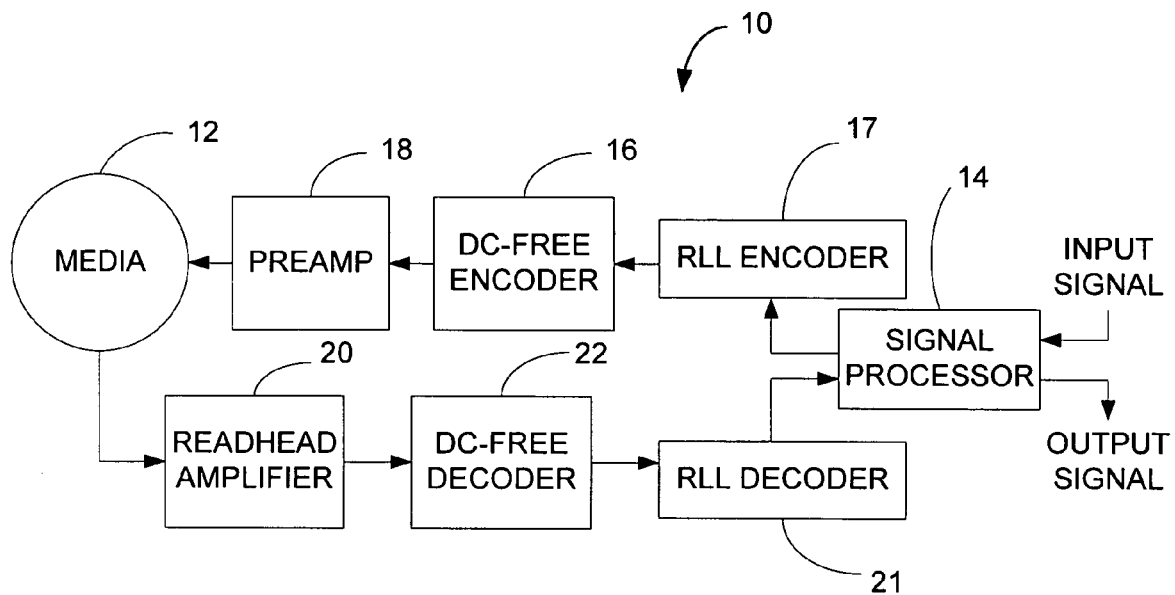
FIG. 1 is a block diagram of a harddisk assembly.

FIG. 1 shows a storage assembly 10 for storing data. The storage assembly 10 includes media 12 to which data may be written and read. Perpendicular recording is preferably employed to write and read data to the media 12 and may be included in any known storage device such as hard drives and optical disks. In a writing operation, a signal processor 14 may apply compression and error correction schemes to an input signal. An RLL encoder 17 converts the processed input signal to a format suitable for storage by the storage unit 12. A DC-free encoder 16 employs an encoding scheme to control DC offset in the read back signal when perpendicular recording is used for writing the signal to the media 12. The DC-free code implemented by the encoder 16 may locally limit the average DC level over an interval extending beyond one codeword, one sector, or any portion of the communication over which the code is applied. The code rate may be L/(L+1) and the error propagation due to a DC free decoder 22 is about 1 bit for some aspects. The code may preserve an RLL constraint. A preamp 18 amplifies and writes the encoded signal to the media 12. A readhead amplifier 20 detects and generates the read back signal by reading data from the media 12. The readhead amplifier 20 may include a read equalizer and detector for equalizing and detecting the data. The read back signal may be decoded by the DC-free decoder 22 that is suitable for decoding signals that are encoded by the DC-free encoder 16. An RLL decoder 21 may decompress the decoded signal. The signal processor 14 may apply error correction to the decompressed signal to generate an output signal representing the recovered data.

Figure 2:
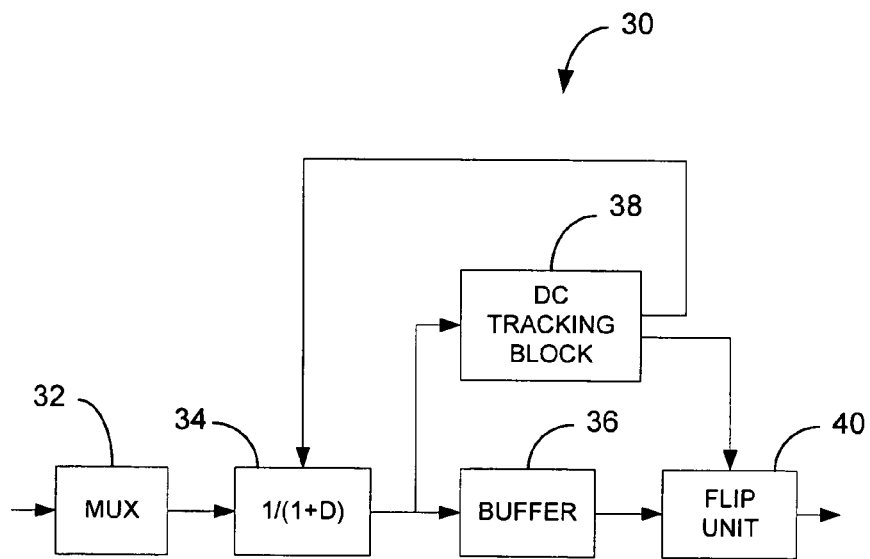
FIG. 2 is a block diagram of an encoder.

FIG. 2 shows an encoder 30 to apply dc-free modulation code to a communication signal. The communication signal may be any signal that communicates information between two assemblies, although the invention is particularly suitable when applied to communication signals that inherently have a DC component such as signals associated with perpendicular recording of storage devices. The encoder 30 may include a multiplexer 32 to insert a zero bit into the first position of the communication signal to form a codeword c(0:L). A precoder 34 precodes the codeword with 1/(1+D). A buffer 36 stores the precoded output from the precoder 34. The buffer 36 may be a first-in-first-out (FIFO) buffer. A DC tracking block 38 computes the DC component associated with the first half of the codeword and generates a flip signal based on the computation and the DC component of the second half of the previous codeword. A flip unit 40, in response to the flip signal, may flip the output of the buffer 36 or output the buffer output unflipped. The DC tracking block 38 may also generate a state signal to cause the precoder 34 to flip state before processing the second half of the codeword. The state signal may be active in response to the flip signal causing the buffer output to be flipped.

Figure 3:
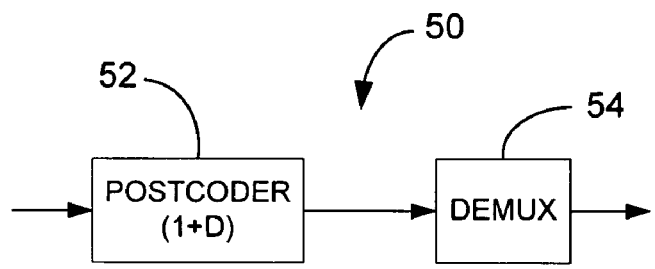
FIG. 3 is a block diagram of a decoder.

FIG. 3 shows a DC-free decoder 50 to decode a communication signal that is encoded with DC-free code. The DC-free decoder 50 includes a postcoder 52 to postcode the communication signal. The postcoder 52 preferably postcodes the signal with "1+D". A demultiplexer 54 strips off the first bit of each codeword that is postcoded to recover the data that was encoded.

Figure 4:
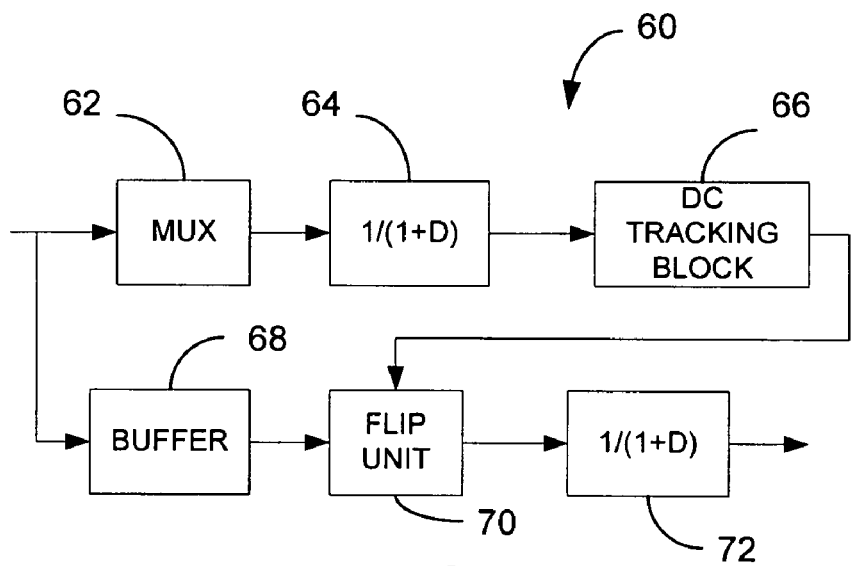
FIG. 4 is a block diagram of an encoder.

FIG. 4 shows another DC-free encoder 60 for encoding a communication signal. The communication signal preferably includes Run Length Limited (RLL) encoding although RLL encoding is not required. A multiplexer 62 and buffer 68 both receive the RLL encoded signal. The multiplexer 62 inserts a zero bit into the communication signal to form a codeword. A first precoder 64 precodes the codeword with 1/(1+D). A DC tracking block 66 computes the DC component associated with the first half of the codeword and generates a flip signal based on the computation and the DC-level in the second half of the previous codeword. The buffer 68 stores the received communication signal. The buffer 68 may be a FIFO buffer. A flip unit 70 receives the output of the buffer 68 and, in response to the flip signal, inserts a 1 or 0 into the buffer output to form a codeword. A second precoder 72 precodes the codeword with 1/(1+D).

Figure 5:
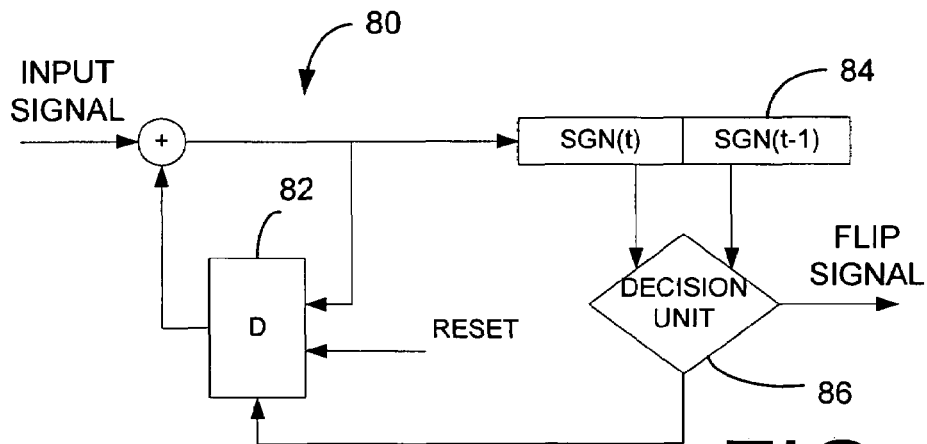
FIG. 5 is a block diagram of a DC tracking block.

FIG. 5 shows a DC tracking block 80 for computing the DC component of a communication signal. The DC tracking block 80 may compute the DC component over any portion of the communication signal including a half codeword, a full codeword, and a sector. The output of a feed back loop, dc(t), is sampled at time $t_k = k*(L+1)/2$, k=1,2 . . . and the sign, $sgn(2*dc(t_k) - (L+1)/2) = t_k$, is stored in a register 84. The sampling times may correspond to the middle and end of each dc free codeword. An accumulator 82 of a feed back filter may be reset to zero following each sampling time. A decision unit 86 may determine whether to flip the n-th code-word n=1,2,3 . . . after $sdc(t_{2(n-1)+1})$ becomes available. In that instance the decision to flip is made if $sdc(t_{2(n-1)+1}) = sdc(t_{2(n-1)})$; otherwise we do not flip. If the decision to flip is made, then the state signal is generated to flip the precoder state and $sdc(t_{2(n-1)+1})$ is reset to sdc $(t_{2(n-1)+1})$.

Figure 6:
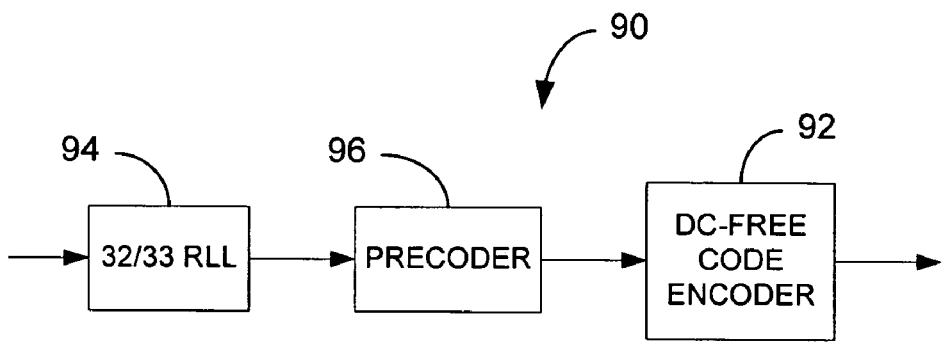
FIG. 6 is a block diagram of an encoder.

FIG. 6 shows a communication system 90 including a 33/34 DC-free encoder 92 for encoding a communication signal. The input bits of the communication system 90 may first be passed through a 32/33 RLL encoder 94. Since 32/33 code is typically designed in the interleaved non-return to zero invert (INRZI) domain, the data may then be passed through a 1/(1+D) precoder 96 to convert the codeword into non-return to zero invert (NRZI) domain. Finally, the 33/34 dc-free encoder 92 is used to limit the DC fluctuations of the coded data. The RLL constraint of the code may be (0, 23/15).

Figure 7:
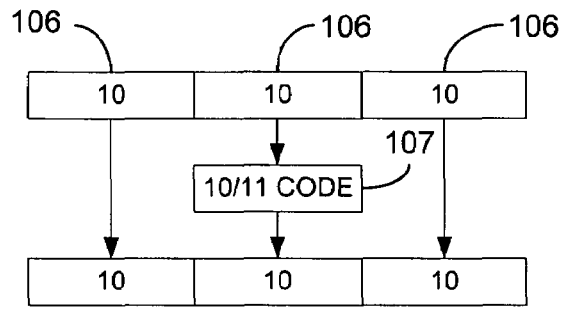
FIG. 7 is a block diagram of a 30/31 RLL encoder.
Figure 8:
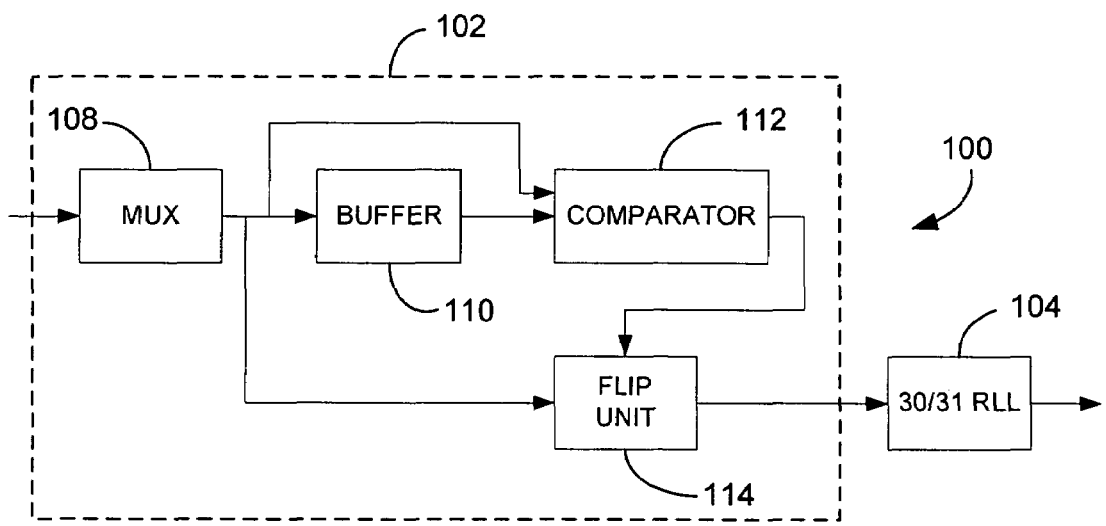
FIG. 8 is a block diagram of an encoder.

FIGS. 7 and 8 show another communication system 100 including a 30/31 dc-free encoder 102 to encode a communication signal. The DC limited code implemented in the 30/31 dc-free encoder 102 may be used with 30/31 non-return to zero (NRZ) RLL code. Since 30/31 code is typically constructed in NRZ domain, the construct for the DC limited code shown in FIGS. 2–6 may not be preferable since the dc-free code shown in FIGS. 2–6 operates in NRZI. Using the code construct shown in FIGS. 2–6 with 30/31 NRZ RLL code may cause error propagation. Therefore, the construct shown in FIGS. 7 and 8 may be advantageous when employed with RLL code designed in the NRZ domain.

30/31 RLL code generally is designed in NRZ domain and does not have error propagation across 10-bit ECC byte boundaries. An RLL encoder 104 takes in three 10-bit symbols 106 and encodes the middle one with 10/11 RLL code 107, where the encoding depends on the last two bits of the first symbol (however these bits are not altered by the encoder).

The 30/31 dc-free encoder 102 may include a multiplexer 108 to take in 30 bits, w(0:29), and form a 31-bit codeword c=(0,w) by inserting a 0 at the beginning. A buffer 110 stores a portion of the codeword. A comparator 112 may then compare the dc content of the last 10 bits of the previous codeword with the dc content of the first 11 bits of the current one. If these quantities have the same sign, a flip unit 114 may flip the first 11 bits of the current codeword. Next, c(1:30) is sent to the 30/31 RLL encoder 104 to be encoded. The 30/31 dc-free code has no error propagation across error correction circuit (ECC) symbol boundaries while preserving the RLL constraint of the 30/31 code. In addition, the DC content in 2 bytes spanning the last byte of previous codeword and the first byte of current codeword is controlled. The DC content of the middle byte may also be controlled by RLL constraints imposed by the 10/11 RLL code.

Figure 9:
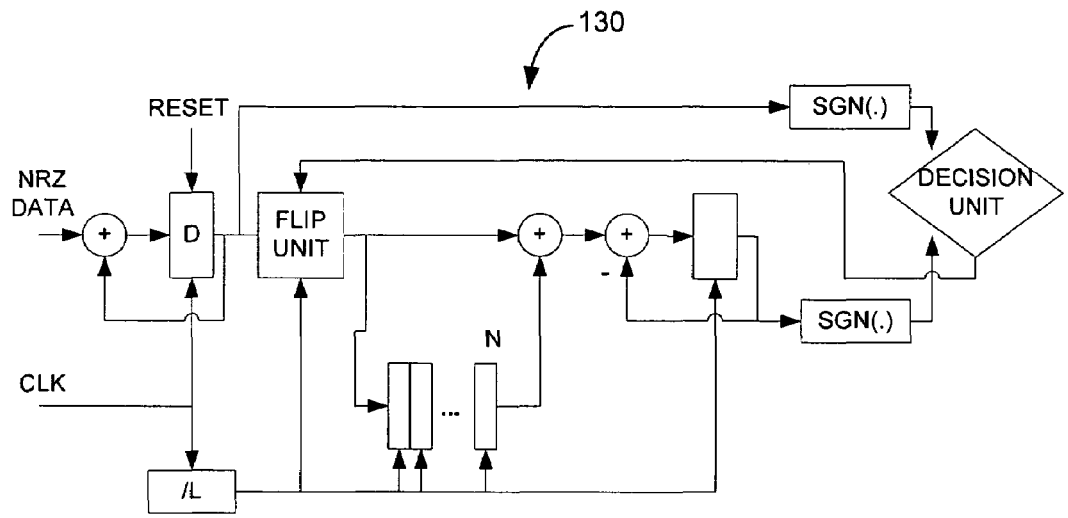
FIG. 9 is a block diagram of a DC tracking block.

FIG. 9 shows an aspect of a DC tracking block 130 that takes the DC level of a current code-word and compares it with the accumulated DC-level of the n last codewords.

Figure 10:
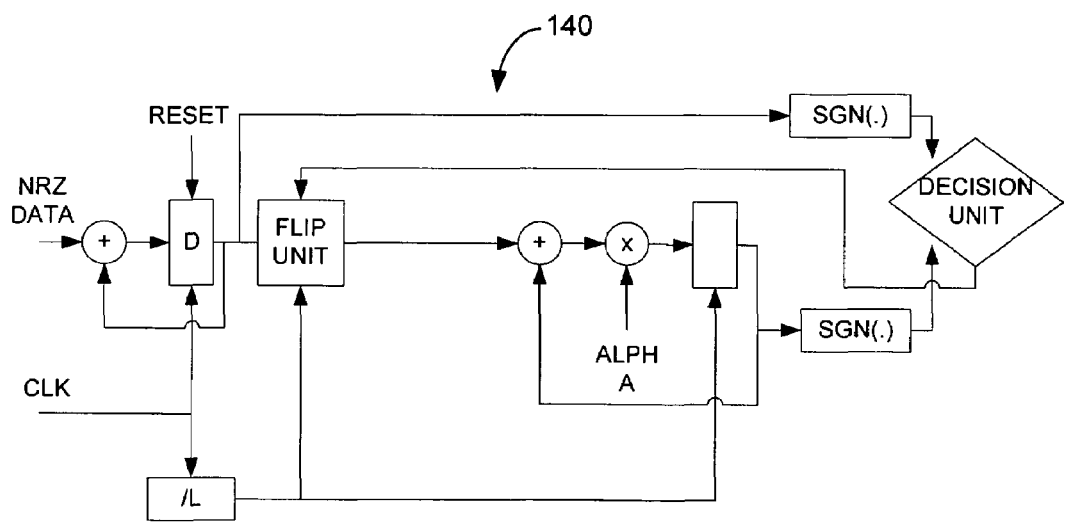
FIG. 10 is a block diagram of a DC tracking block.

FIG. 10 shows another aspect of a DC tracking block 140 that uses a weighted average of the DC level of previous codewords and compares that to the DC level of a current codeword. The weighting may be exponentially decreasing for older codewords. For example, when codeword i is the current codeword, then the weighting for codeword k, k<i, will be $a^{i-k}$, for a<1. The extension to individual weights for codewords j codewords prior to the current is straightforward, up to a predetermined number of codewords.

Figure 11:
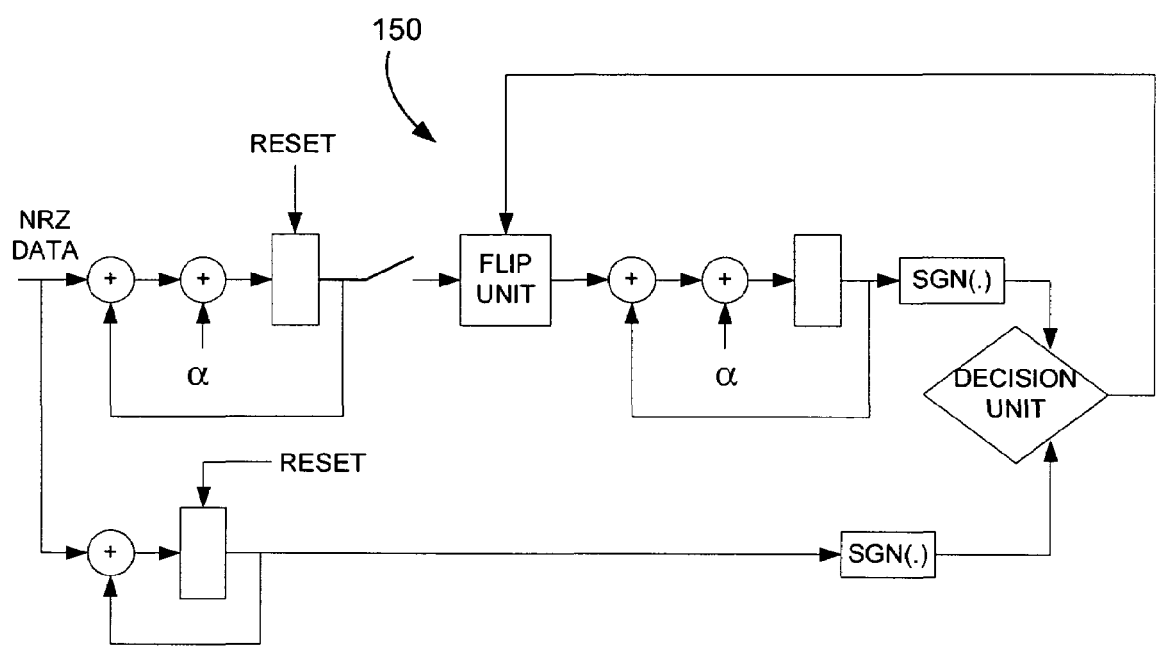
FIG. 11 is a block diagram of a DC tracking block.

FIG. 11 shows another aspect of a DC tracking block 150 that uses a weighted average of bits, rather than codewords. The DC level of the current codewords is compared to a weighted average of previous codesymbols, using weights that may be exponentially decreasing.

Figure 12:
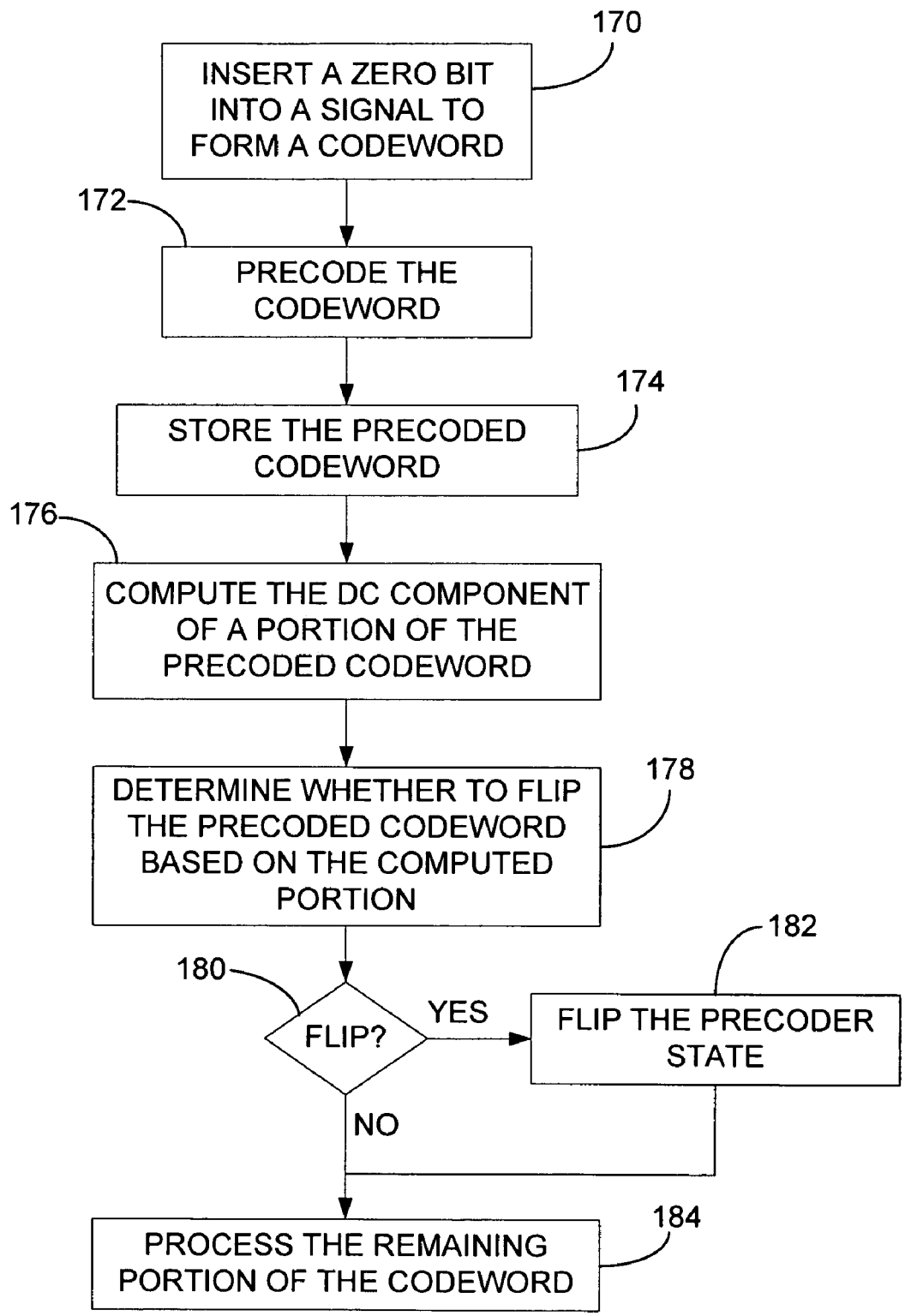
FIG. 12 is a flow diagram of an encoding scheme.

FIG. 12 shows a process of encoding a communication signal. Beginning at block 170, a codeword c(0:L) is formed by inserting a zero bit, c=(0,w), into an input w(0:L−1). Continuing at block 172, the codeword may be precoded with a 1/(1+D) precoder. At block 174, the precoded codeword may be stored in a buffer. At block 176, the DC component of a portion of the precoded codeword may be computed. Based on the computed portion, a determination is made whether to flip the codeword and whether all or a portion of the codeword should be flipped, block 178. Continuing to blocks 180 and 182, if all or a portion of the codeword is to be flipped, then the precoder state is flipped. Alternatively continuing to block 180, if the codeword is not flipped, then control passes to block 184 at which the remaining portion of the codeword is processed.

A number of embodiments of the invention have been described. Nevertheless, it will be understood that various modifications may be made without departing from the spirit and scope of the invention. Accordingly, other embodiments are within the scope of the following claims.

What is claimed is:

1. An encoder that encodes a communication signal, comprising:
   a precoder that precodes portions of said communication signal, wherein said portions comprise M bits where M is greater than 1;
   a buffer that buffers said portions;
   a DC tracking device that modulates a flip signal based on a comparison of a DC value of one of said portions of said communication signal and an average DC value of N previous bits of said communication signal where N is greater than M; and
   a flip device that selectively flips said portions based on said flip signal.

2. The encoder of claim 1 wherein each of said portions includes a sector.

3. The encoder of claim 1 wherein each of said portions includes a codeword.

4. An encoder that encodes a communication signal, comprising:
   a precoder that precodes portions of said communication signal, wherein said portions comprise M bits where M is greater than 1;
   a buffer that buffers a first signal associated with the communication signal;
   a DC tracking device that modulates a flip signal based on a comparison of a DC value of one of said portions of said communication signal and an average DC value of N previous bits of said communication signal where N is greater than M;
   a flip device that selectively flips an output of said buffer based on said flip signal; and
   a multiplexer that communicates with said precoder and that appends a bit to said portions to form codewords.

5. An encoder that encodes a communication signal, comprising:
   a precoder that precodes portions of said communication signal, wherein said portions comprise M bits where M is greater than 1;
   a buffer that buffers a first signal associated with the communication signal;
   a DC tracking device that modulates a flip signal based on a comparison of a DC value of one of said portions of said communication signal and an average DC value of N previous bits of said communication signal where N is greater than M;
   a flip device that selectively flips an output of said buffer based on said flip signal,
   wherein said precoder applies a 1/(1+D) channel characteristic to said portions.

6. The encoder of claim 1 wherein an average DC value of said communication signal is reduced by said encoder.

7. A disk drive comprising:
   a signal processor that processes a perpendicular recording input signal;
   a DC-free encoder that generates an encoded signal as a function of said perpendicular recording input signal and that includes a DC tracking device that modulates a flip signal based on a comparison of a DC value of a current portion of said communication signal, wherein said current portion includes M bits and wherein M is an integer greater than one, and an average DC value of N previous bits of said communication signal where N is greater than M; and
   a preamplifier that transmits said encoded input signal.

8. The disk drive of claim 7 further comprising media that stores said encoded input signal as data.

9. A disk drive comprising:
   a signal processor that processes a perpendicular recording input signal;
   a DC-free encoder that generates an encoded signal as a function of said perpendicular recording input signal and that includes a DC tracking device that modulates a flip signal based on a comparison of a DC value of a current portion of said communication signal and an average DC value of N previous bits of said communication signal where N is greater than M;
   a preamplifier that transmits said encoded input signal;
   media that stores said encoded input signal as data;
   a read head amplifier that reads said data from said media; and
   a DC-free decoder that decodes said data,
   wherein said signal processor generates an output signal as a function of said decoded data.

10. The disk drive of claim 9 wherein said DC-free encoder further includes;
    a precoder that precodes portions of said perpendicular recording input;
    a buffer that buffers a first signal associated with the communication signal; and
    a flip device that selectively flips an output of said buffer based on said flip signal.

11. The disk drive of claim 10 wherein an average DC value of said communication signal is reduced by said DC-free encoder.

12. The disk drive of claim 10 wherein each of said portions includes a sector.

13. The disk drive of claim 10 wherein each of said portions includes a codeword.

14. The disk drive of claim 10 further comprising a multiplexer that communicates with said precoder and that appends a bit to said portions to form codewords.

15. An encoder that encodes a communication signal, comprising:
    precoding means for preceding portions of said communication signal, wherein said portions comprise M bits where M is greater than 1;
    buffer means for buffering said portions;
    DC tracking means for modulating a flip signal based on a comparison of a DC value of one of said portions of said communication signal and an average DC value of N previous bits of said communication signal where N is greater than M; and
    flip means for selectively flipping said portions based on said flip signal.

16. The encoder of claim 15 wherein each of said portions includes a sector.

17. The encoder of claim 15 wherein each of said portions includes a codeword.

18. An encoder that encodes a communication signal, comprising:
    precoding means for precoding portions of said communication signal, wherein said portions comprise M bits where M is greater than 1;
    buffer means for buffering a first signal associated with the communication signal;
    DC tracking means for modulating a flip signal based on a comparison of a DC value of one of said portions of said communication signal and an average DC value of N previous bits of said communication signal where N is greater than M;
    flip means for selectively flipping an output of said buffer means based on said flip signal; and
    multiplexing means that for communicating with said precoding means and for appending a bit to said portions to form codewords.

19. An encoder that encodes a communication signal, comprising:
    precoding means for precoding portions of said communication signal wherein said portions comprise M bits where M is greater than 1;
    buffer means for buffering a first signal associated with the communication signal;
    DC tracking means for modulating a flip signal based on a comparison of a DC value of one of said portions of said communication signal and an average DC value of N previous bits of said communication signal where N is greater than M; and
    flip means for selectively flipping an output of said buffer means based on said flip signal, wherein said precoding means applies a 1/(1+D) channel characteristic to said portions.

20. The encoder of claim 15 wherein an average DC value of said communication signal is reduced by said encoder.

21. A disk drive comprising:
   signal processor for processing a perpendicular recording input signal;
   DC-free encoding means for generating an encoded signal as a function of said perpendicular recording input signal and that includes a DC tracking means for modulating a flip signal based on a comparison of a DC value of a current portion of said communication signal, wherein said current portion includes M bits and wherein M is an integer greater than one, and an average DC value of N previous bits of said communication signal where N is greater than M; and
   preamplifier means for transmitting said encoded input signal.

22. The disk drive of claim 21 further comprising storing means for storing said encoded input signal as data.

23. A disk drive comprising:
   signal processor for processing a perpendicular recording input signal;
   DC-free encoding means for generating an encoded signal as a function of said perpendicular recording input signal and that includes a DC tracking means for modulating a flip signal based on a comparison of a DC value of a current portion of said communication signal and an average DC value of N previous bits of said communication signal where N is greater than M;
   preamplifier means for transmitting said encoded input signal;
   read head amplifying means for reading said data from said storing means; and
   DC-free decoding means for decoding said data,
   wherein said signal processor generates an output signal as a function of said decoded data.

24. The disk drive of claim 23 wherein said DC-free encoding further includes;
   precoding means for precoding portions of said perpendicular recording input signal;
   buffer means for buffering a first signal associated with the communication signal; and
   flip means for selectively flipping an output of said buffer means based on said flip signal.

25. The disk drive of claim 24 wherein an average DC value of said communication signal is reduced by said DC-free encoding means.

26. The disk drive of claim 24 wherein each of said portions includes a sector.

27. The disk drive of claim 24 wherein each of said portions includes a codeword.

28. The disk drive of claim 24 further including multiplexing means for communicating with said precoding means and for appending a bit to said portions to form codewords.

29. A method for encoding a communication signal, comprising: preceding said portions, wherein said portions comprise M bits where M is greater than 1;
   buffering said portions;
   modulating a flip signal based on a comparison of a DC value of a current portion of said communication signal and an average DC value of N previous bits of said communication signal where N is greater than M; and
   selectively flipping said portions based on said flip signal.

30. The method of claim 29 wherein each of said portions includes a sector.

31. The method of claim 29 wherein each of said portions includes a codeword.

32. A method for encoding a communication signal, comprising:
   precoding said portions, wherein said portions comprise M bits where M is greater than 1;
   buffering a first signal associated with the communication signal;
   modulating a flip signal based on a comparison of a DC value of a current portion of said communication signal and an average DC value of N previous bits of said communication signal where N is greater than M;
   selectively flipping an output of said buffer based on said flip signal; and
   appending a bit to said portions to form codewords.

33. A method for encoding a communication signal, comprising:
   precoding said portions, wherein said portions comprise M bits where M is greater than 1;
   buffering a first signal associated with the communication signal;
   modulating a flip signal based on a comparison of a DC value of a current portion of said communication signal and an average DC value of N previous bits of said communication signal where N is greater than M;
   selectively flipping an output of said buffer based on said flip signal; and
   applying a 1/(1+D) channel characteristic to said portions.

34. The method of claim 29 wherein an average DC value of said communication signal is reduced by said encoder.

35. A method for operating a disk drive comprising:
   processing a perpendicular recording input signal;
   generating an encoded signal as a function of said perpendicular recording input signal;
   modulating a flip signal based on a comparison of a DC value of a current portion of said communication signal, wherein said current portion includes M bits and wherein M is an integer greater than one, and an average DC value of N previous bits of said communication signal where N is greater than M; and
   transmitting said encoded input signal.

36. The method of claim 35 further comprising storing said encoded input signal as data on media.

37. A method for operating a disk drive comprising:
   processing a perpendicular recording input signal;
   generating an encoded signal as a function of said perpendicular recording input signal;
   modulating a flip signal based on a comparison of a DC value of a current portion of said communication signal and an average DC value of N previous bits of said communication signal where N is greater than M;
   transmitting said encoded input signal;
   reading said data from said media;
   decoding said data; and
   generating an output signal as a function of said decoded data.

38. The method of claim 37 further comprising:
   precoding said portions;
   buffering a first signal associated with the communication signal in a buffer; and
   selectively flips an output of said buffer based on said flip signal.

39. The method of claim 38 wherein an average DC value of said communication signal is reduced.

40. The method of claim 35 wherein each of said portions includes a sector.

41. The method of claim 35 wherein each of said portions includes a codeword.

42. The method of claim 38 further comprising appending a bit to said portions to form codewords.

* * * * *

UNITED STATES PATENT AND TRADEMARK OFFICE
CERTIFICATE OF CORRECTION

PATENT NO. : 7,199,731 B1  Page 1 of 1
APPLICATION NO. : 11/181401
DATED : April 3, 2007
INVENTOR(S) : Gregory Burd et al.

It is certified that error appears in the above-identified patent and that said Letters Patent is hereby corrected as shown below:

Title Page: Item (57)   Abstract, insert --1-- after "greater than"
Column 6, Line 51:   Delete "that" after "means"
Column 7, Line 56:   Delete "preceding" and insert --precoding--
Column 8, Line 57:   Delete "flips" and insert --flipping--

Signed and Sealed this

Twelfth Day of June, 2007

JON W. DUDAS
*Director of the United States Patent and Trademark Office*